United States Patent [19]

Matthews et al.

[11] Patent Number: 4,677,828

[45] Date of Patent: Jul. 7, 1987

[54] CIRCUMFERENTIALLY AREA RULED DUCT

[75] Inventors: John A. Matthews, Melrose; Edmund E. Striebel, South Windsor; Domingo Sepulveda, Vernon; Francis C. Pane, Jr., South Windsor, all of

[73] Assignee: United Technologies Corporation, Hartford, Conn.

[21] Appl. No.: 671,385

[22] Filed: Nov. 13, 1984

Related U.S. Application Data

[63] Continuation-in-part of Ser. No. 504,996, Jun. 16, 1983, abandoned.

[51] Int. Cl.⁴ .............................................. F02C 1/00
[52] U.S. Cl. ................................ 60/751; 415/DIG. 1
[58] Field of Search ............................... 60/751, 722; 415/DIG. 1; 138/39; 244/130, 535; 137/15.1, 15.2

[56] References Cited

U.S. PATENT DOCUMENTS 3,806,067 4/1974 Kutney ............................ 244/53 R
3,978,664 9/1976 Parker et al. ........................ 60/751
4,369,149 1/1983 Violett .......................... 415/DIG. 1

Primary Examiner—Carlton R. Croyle
Assistant Examiner—Timothy S. Thorpe
Attorney, Agent, or Firm—Norman Friedland

[57] ABSTRACT

The area ruling of an annular diffuser disposed between the compressor and burner of a gas turbine engine is proportioned in a circumferential direction so that the maximum area ruling is adjacent the struts supporting the diffuser walls and the minimum is mid-way between the struts so as to achieve a substantial uniform velocity profile of the exiting air in the circumferential direction.

2 Claims, 5 Drawing Figures

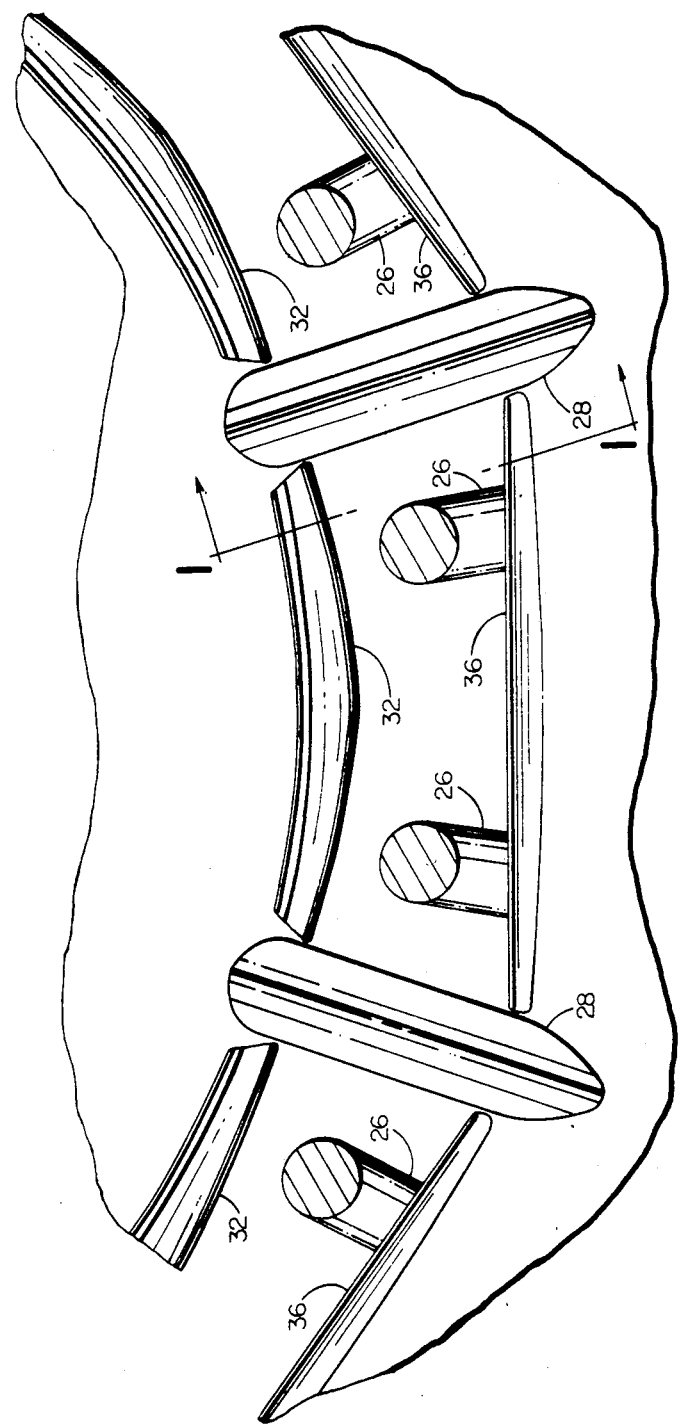

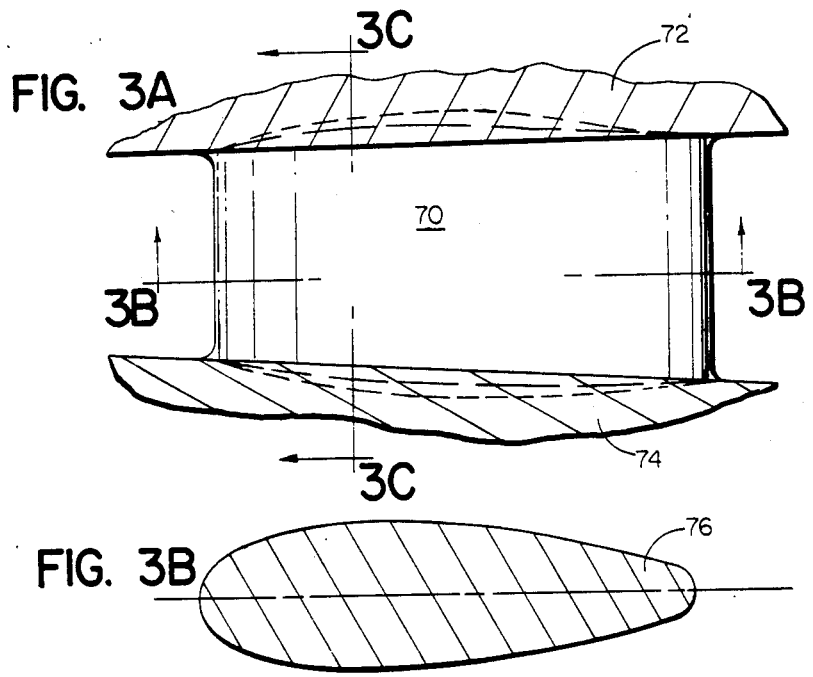
FIG. 3A
FIG. 3B
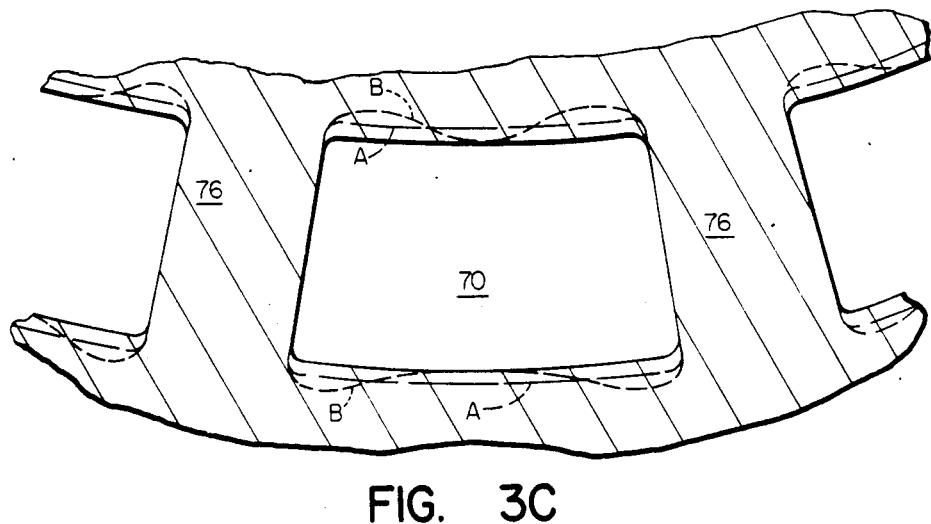
FIG. 3C

CIRCUMFERENTIALLY AREA RULED DUCT

CROSS REFERENCE

This invention is related to the invention disclosed in copending patent application entitled DIFFUSER, filed by E. E. Striebel, J. A. Matthews, D. Sepulveda and F. C. Pane, Jr., respectively on even date and both assigned to the same assignee of this application.

This is a Continuation-in-Part of application Ser. No. 504,996 filed on June 16, 1983, now abandoned.

DESCRIPTION

1. Technical Field

This invention relates to gas turbine engines and particularly to the prediffuser feeding compressor discharge air to the burner.

2. Background Art

As is well known, it is common practice for a prediffuser in a turbine type power plant having an axial flow compressor to diffuse the compressor discharge air prior to being admitted into the burner. Further, a well known method of diffusing is to employ a prediffuser which feeds a dump diffuser just ahead of the burner. A typical prediffuser is formed from conical diverging walls that are supported by struts mounted between the diffuser walls. Obviously, these struts become an obstruction in the flow path and as a result induce wakes with a concurrent increase in pressure loss. A well known method of minimizing this loss is by increasing the area exposed to the flow by extending the diffuser walls radially. Such radial area ruling has been practiced for many years and, in fact, to some degree reduces pressure loss and the strut wake effect. This is particularly true where the struts are mounted relatively close to each other. However, when the struts are separated, the conventional radial area ruling provides insufficient area increase near the strut and excessive area increase remote from the strut.

We have found that we can improve on the performance of a prediffuser by proportioning the area ruling circumferentially so that there is a maximum area ruling near the strut and a minimum area ruling away from the strut. By virtue of this invention the pressure loss incurred due to the thick transverse strut is reduced by minimizing the overspeed associated with the local blockage without incurring an excessive adverse gradient on the circumferential wall away from the strut.

In addition the flow exiting the duct has a more uniform circumferential velocity profile and thus has the propensity to improve performance downstream. As an example, the performance of a liner disposed behind a strutted prediffuser would be benefitted.

In actual tests of this invention on existing engine models, the pressure loss was reduced 35% and flow nonuniformity was reduced over 60%.

DISCLOSURE OF INVENTION

An object of this invention is to provide an improved diffuser (prediffuser) for a gas turbine engine. A feature of this invention is to proportion the area ruling circumferentially in the diffuser which includes circumferentially disposed struts extending between the inner and outer walls of an annular diffuser and which struts are so spaced that some of the flow intermediate to adjacent struts is not influenced by air blockage caused by the struts. Such proportion is such that maximim area ruling is near the strut and minimum area ruling is away from the strut.

BRIEF DESCRIPTION OF DRAWING(S)

FIG. 2 is a partial end view of the diffuser of FIG. 1.

FIG. 3a is a schematic illustration of a passageway of the diffuser between adjacent struts.

FIG. 3b is a view in schematic taken along lines 3b—3b showing the strut of FIG. 3a, and FIG. 3c is a view in schematic taken along lines 3c—3c showing a portion of the annular diffuser that illustrates the area ruling effects.

BEST MODE FOR CARRYING OUT THE INVENTION

Figure 1:
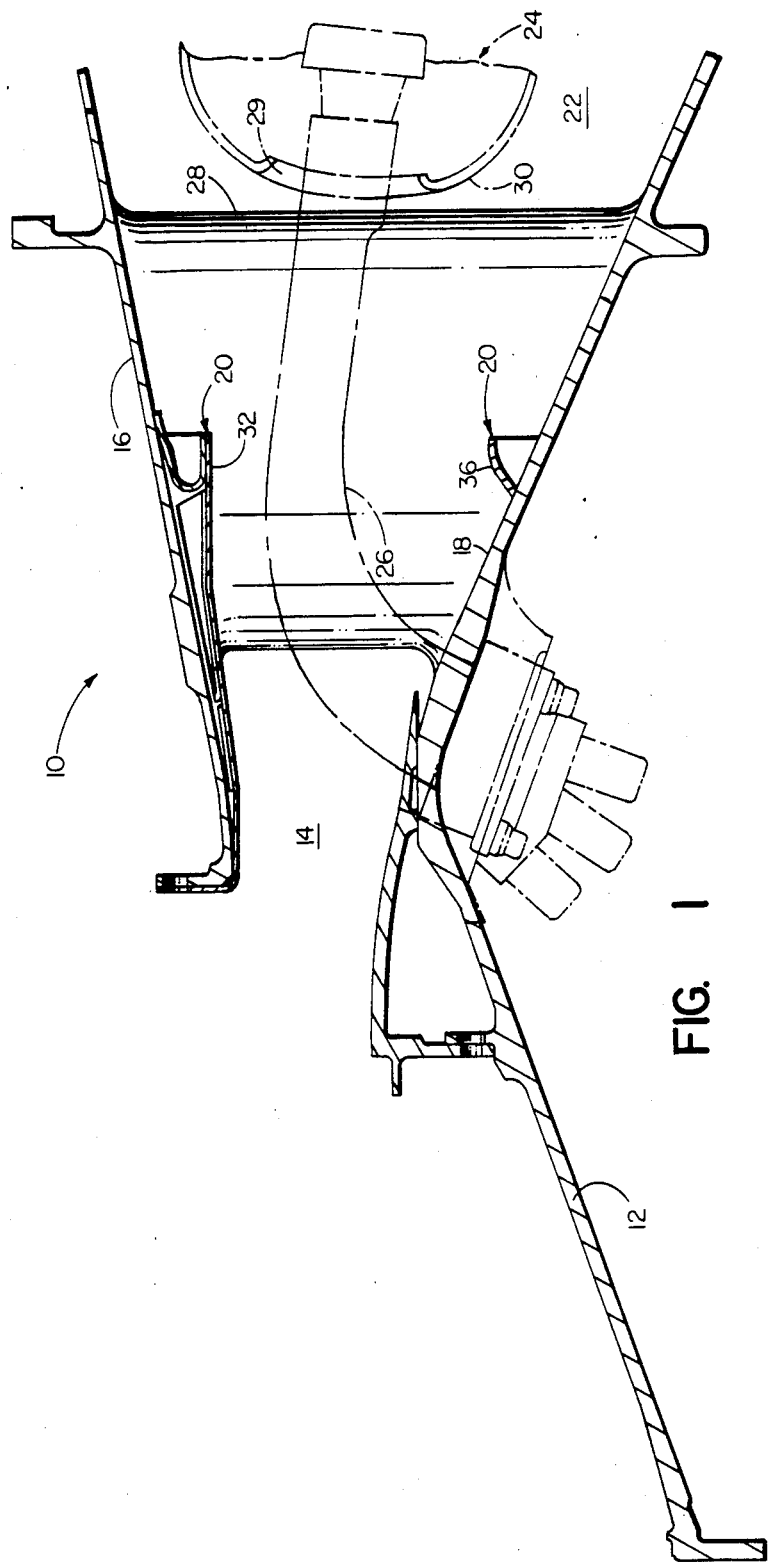
FIG. 1 is a partial view partly in section and partly in phantom illustrating the diffuser, fuel injector support and combustor of a gas turbine engine.

While this invention in its preferred embodiment is shown as being utilized to modify an existing engine, it will be appreciated that this invention can be equally applied to new engine models given similar problems. For the sake of simplicity and convenience only that portion of a gas turbine power plant that is necessary for an understanding of this invention is being described herein. For further details of an exemplary engine reference should be made to the JT-9D engine manufactured by Pratt & Whitney Aircraft Group of United Technologies Corporation, the assignee of this patent application.

Referring to FIGS. 1 and 2, the diffuser, which in this instance is considered as a prediffuser as will be explained in further detail hereinbelow, is generally indicated by reference numeral 10 and is annular in shape and connected to the high pressure compressor case 12 and the engine case (not shown). Typically, air discharged from the high pressure compressor is fed into inlet 14 of the diffuser which is formed from an inner conical wall 16 (relative to the centerline) and an outer diverging wall 18. The confined air within the prediffuser flows from the inlet 14 to outlet 20 in an increasing cross-sectional area which allows the velocity of air stream to slow down converting the dynamic pressure head into static pressure, where it discharges into the dump diffuser 22 for diffusing further. The larger portion of air in the dump diffuser is fed into the burner through radial holes (not shown) surrounding the burner liner 24.

Also, typical in this installation is the inclusion of the fuel injector supports 26 which are circumferentially spaced about the annulus and extend through holes formed in the prediffuser outer wall 18 and extend between transverse struts 28 and extend into the burner through apertures 29 formed in hood 30. Although not shown in detail the fuel injection supports house the fuel lines and the fuel nozzles feeding fuel into the burner.

As is obvious from the foregoing, as the air progresses through the prediffuser, the flow encounters considerable blockage from fuel injector supports 26 which create wakes in the downstream direction which, in turn, propagate into the burner. It has been found that circumferential area ruling is not beneficial for all types of diffusers but is beneficial if the number of struts are more than 8 and less than 20 and are specific to diffusers that are sized to fit within a gas turbine engine. Their blockage and the blockage from the aerodynamic shaped transverse struts 28 are compensated for by additional divergence of the outer wall 18 beyond that normally provided by an unblocked stable prediffuser. At the aft plane of the transverse portion of the fuel injector supports 26, the flow would normally begin to separate from the fuel injector support wall 18; to this end a bell-mounted shaped convergent outer wall 36 acts to converge the flow behind the support and minimize the wake behind the injector support. Both walls 32 and 36, as can best be seen in FIG. 2, are suitably joined to the diffuser inner and outer wall and extend between struts around the circumference of the diffuser.

According to the invention the area ruling is proportioned circumferentially so that there is maximum area ruling near the strut and minimum area ruling away from the strut. This can best be understood by referring to FIGS. 3a, 3b and 3c, which shows the passageway 70 of the diffuser defined between the inner wall 72 and outer wall 74 and between adjacent struts 76. As can be seen and represented by the larger dash line A the typical area ruling is a constant radius in the circumferential direction. This fails to take into consideration that the strut more strongly influences the flow adjacent thereto than it does the flow further away. Accordingly, the area ruling, according to the invention incorporates a nonconstant radius and changes the area ruling so that a larger area is exposed to the flow adjacent to the strut and the area in the center between adjacent struts remains as originally configured. This is illustrated by the shorter dash lines B. Obviously, in certain designs the entire area ruling may be shifted to accommodate the blockage effect of the struts.

FIG. 2 shows the area ruling effect on existing hardware where the conical annular inner walls 32 and the bell-mouthed convergent annular outer wall 36 are dimensioned to give substantially the area ruling proportions incorporating ths invention. As noted, the maximum area ruling is near the struts and the minimum is furthest away toward the center between struts.

It should be understood that the invention is not limited to the particular embodiments shown and described herein, but that various changes and modifications may be made without departing from the spirit and scope of this novel concept as defined by the following claims.

We claim:

1. In combination, a gas turbine engine having a burner for receiving a working medium, an annular diffuser having an inner conically shaped wall and an outer conically shaped wall diverging relative to each other for diffusing said working medium prior to entering said burner, at least eight, but less then 20, equally spaced struts between said inner wall and outer wall supporting said walls in spaced relationship, said struts defining with said inner and outer walls open-ended passageways within said diffuser and being an obstruction to the flow passing therethrough, means for compensating for said obstruction to obtain a relatively uniform velocity profile in the circumferential direction, said means including a circumferential increase in cross sectional flow area of each of the diffuser passageways formed by each of said inner and outer walls on either side of each of said struts, and said inner and outer walls having a displaced portion of concave shape merging with an adjacent strut and further including convex wall portions disposed between each pair of adjacent concave portions.

2. In combination, a gas turbine engine, a diffuser in said engine having a pair of diverging annular walls for flowing fluid from an upstream to a downstream direction, at least eight, but less than 20, equally spaced strut-like elements in said diffuser uniformly spaced around the circumference thereof defining open-ended passageways and being an obstruction to the flow passing therethrough, means for compensating for said obstruction to obtain a relatively uniform velocity profile in the circumferential direction, said means including a circumferential increase in cross sectional flow area of each of the diffuser passageways formed by each of said annular walls on either side of each of said strut-like elements and said annular walls having a displaced portion of concave shape merging with an adjacent strut-like element and further including convex wall portions disposed between each pair of adjacent concave portions.

* * * * *